(12) United States Patent
Manickam et al.

(10) Patent No.: US 8,181,221 B2
(45) Date of Patent: May 15, 2012

(54) METHOD AND SYSTEM FOR MASKING DATA

(75) Inventors: S. A. Vetha Manickam, Chennai (IN); S. Saravanan Nattamai, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 917 days.

(21) Appl. No.: 11/839,827

(22) Filed: Aug. 16, 2007

(65) Prior Publication Data
US 2009/0049512 A1   Feb. 19, 2009

(51) Int. Cl.
G06F 17/00   (2006.01)

(52) U.S. Cl. .......................................... 726/1

(58) Field of Classification Search ....................... 726/1
See application file for complete search history.

(56) References Cited

U.S. PATENT DOCUMENTS

| | | | |
|---|---|---|---|
| 2003/0115179 A1* | 6/2003 | Prabakaran et al. | 707/1 |
| 2007/0136237 A1* | 6/2007 | Barker et al. | 707/2 |

* cited by examiner

Primary Examiner — Jacob Lipman

(57) ABSTRACT

An approach is provided for masking data. A determination is made whether an action initiated by an authenticated user corresponds to one of a plurality of policies stored in a policy store, wherein the policies relate to whether data to be retrieved from a data source is to be masked. A new policy is generated if no match is found in the policy store. Information associated with the new policy is received, wherein the information is input by the user. The new policy is stored in the policy store.

22 Claims, 9 Drawing Sheets

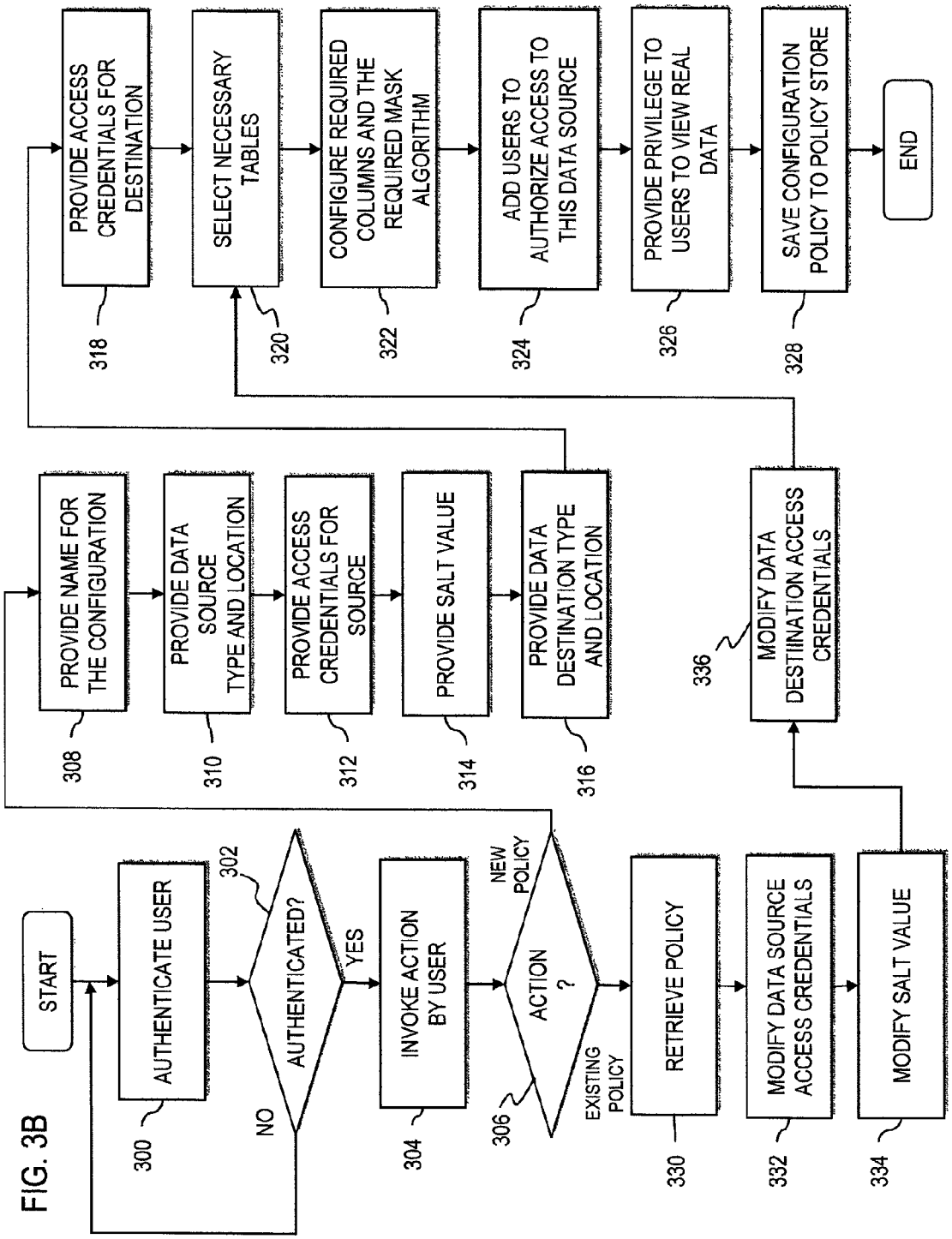

METHOD AND SYSTEM FOR MASKING DATA

BACKGROUND OF THE INVENTION

Globalization and innovations in communication systems have changed the manner in which society lives, does work, etc. Information technological revolutions, such as the Internet, have created a virtual world without boundaries; such exemplars include virtual offices, virtual businesses, virtual hospitals, and online trading. Moreover, modem information technology (IT) operations and IT enabled services can become virtual in terms of off shoring and near shoring. Data management and protection play a key role in advancing these services. It is recognized that while in transit from one physical location to another, personal, business, or goverm-mental sensitive data need to be protected.

In fact, data protection is necessary to ensure compliance with various privacy laws mandated by numerous countries. For example, in many jurisdictions, sensitive data is not permitted to enter foreign land. Consequently, data that crosses a foreign boundary needs to be de-personalized or sanitized. De-personalization, if performed effectively, can stimulate more offshore work.

Conventionally, cryptography has been utilized to ensure data protection. Even though classical cryptographic techniques address the concerns of privacy when data is in transit, such techniques do not effectively resolve the handling of data after its decryption. In addition, it is difficult to implement total communication security; such approach is not only costly, but key management is tedious. Further, because data can be accessed through any application (which protects user level authorization), the data can be inadvertently disclosed to an unauthorized end user.

Therefore, there is a need for an approach for de-personalizing data as to accommodate a wide range of applications.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A and 3B are, respectively, a diagram of a masking configuration wizard application of the system of FIG. 1, and a flowchart of a configuration process, according to various exemplary embodiments;

DESCRIPTION OF THE PREFERRED EMBODIMENTS

A system, method, and software for masking data are described. In the following description, for the purposes of explanation, numerous specific details are set forth in order to provide a thorough understanding of the present invention. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various exemplary embodiments are described with respect to data masking, it is contemplated that these embodiments have applicability to any mechanisms that de-personalizes data.

Figure 1:
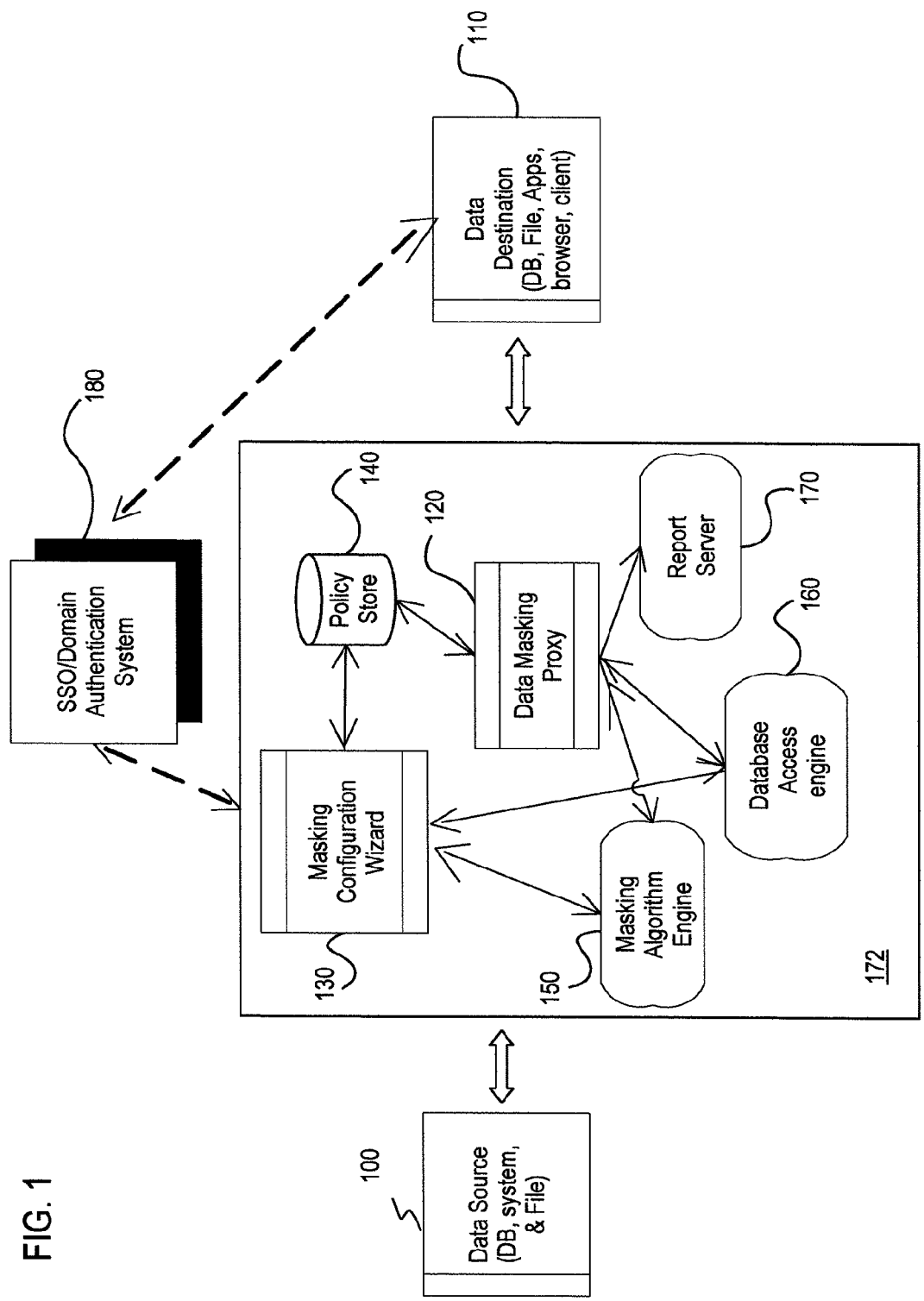
FIG. 1 is a diagram of a system capable of providing data masking, according to an exemplary embodiment.

FIG. 1 is a diagram of a system capable of providing data masking, according to an exemplary embodiment. A data masking architecture is shown in which a data source 100 supplies data to a data destination 110. By way of example, the data source 100 may be a database or file. Also, the data destination 110 can be a database, a file, an application, a browser, a proxy, or a client application. Whenever the data from the data source 100 is accessed by the data destination 110, the data is de-personalized (or sanitized).

According to one embodiment, the data masking architecture includes a data masking proxy 120, a data masking configuration wizard 130, a policy store 140, a masking algorithm engine 150, a data access component 60, and a report server 170. These components constitute a data masking portal 172 for masking the data while accessing the data source 100. The architecture, according to various embodiments, can accommodate a variety of clients: a browser, an application server, a Structure Query Language (SQL) client, a Lightweight Directory Access Protocol (LDAP) client, a mainframe client (e.g., TN3270 client), an editor, etc. The data masking operation, in an exemplary embodiment, can be performed on-the-fly.

Before these clients can access data from the source 100, the end user is authenticated against an enterprise wide authentication system 180, such as Single Sign On (SSO) or Windows Domain system. Based on the authentication and user configuration policy (resident within the policy store 140), the data masking portal 172 determines whether to mask the data.

Policies that are created through the configuration wizard 130 are stored in the policy store 140. In general, the policy store 140 provides secure storage of sensitive data. The data masking proxy 120 will always refers this policy store 140 to mask a given datasource Under this architecture, the report server 170 provides for logging of transactions of the portal 172. In an exemplary embodiment, the report server 170 creates and stores logs for debugging and tracing purposes. In this manner, graphical reports and text reports can be generated based on the transactions. This reporting process can be performed on a daily basis to record information about daily transactions.

The portal 172 can provide either static or dynamic masking. To de-personalize the data either in static or dynamic mode, various techniques can be employed (including, for example, known methods). In case of static masking of a relational database (for instance), a large number of rows are processed, whereas dynamic masking handles a single table/view or a join of more than one table/view. In this example, de-personalized data can be available in different environments, including production and non-production scenarios. Masking is one of the processes for de-personalizing the data by protecting sensitive information in non-production databases from unauthorized visibility. Even though a development team may not require live data, the development team may need de-personalized/sanitized data for testing of an application and trouble shooting of particular scenarios or errors in a static mode. Depersonalization (or sanitization) of data poses several challenges in testing and production environments.

Data de-personalization/sanitization extends beyond the technical obstacles. As noted previously, such de-personalization of data is mandated by law. The legal requirements for data sanitization vary from country to country. In the United States for example, the Gramm-Leach-Bliley Act requires institutions to protect the confidentiality and integrity of personal consumer information. The Right to Financial Privacy Act of 1978 creates statutory Fourth Amendment protection for financial records and there are a host of individual state laws. There are also a number of security and privacy requirements for personal information included in the Health Insurance Portability and Accountability Act of 1996 (HIPAA).

With the European Union, Directive 95/46/EC of the European Parliament provides strict guidelines regarding individual rights to data privacy and the responsibilities of data holders to guard against misuse. The United Kingdom Data Protection Act of 1998 extends the European Parliament directive and places further statutory obligations on the holders of personal, private or sensitive data.

Thus, any organization that, for example, outsources test and development operations needs to be conscious of the specific laws regulating the transmission of information across national borders. However large the legal liabilities associated with such violations are, the costs may be trivial in comparison to the losses associated with the catastrophic loss of business confidence that is caused by a large scale privacy breach.

Figure 2:
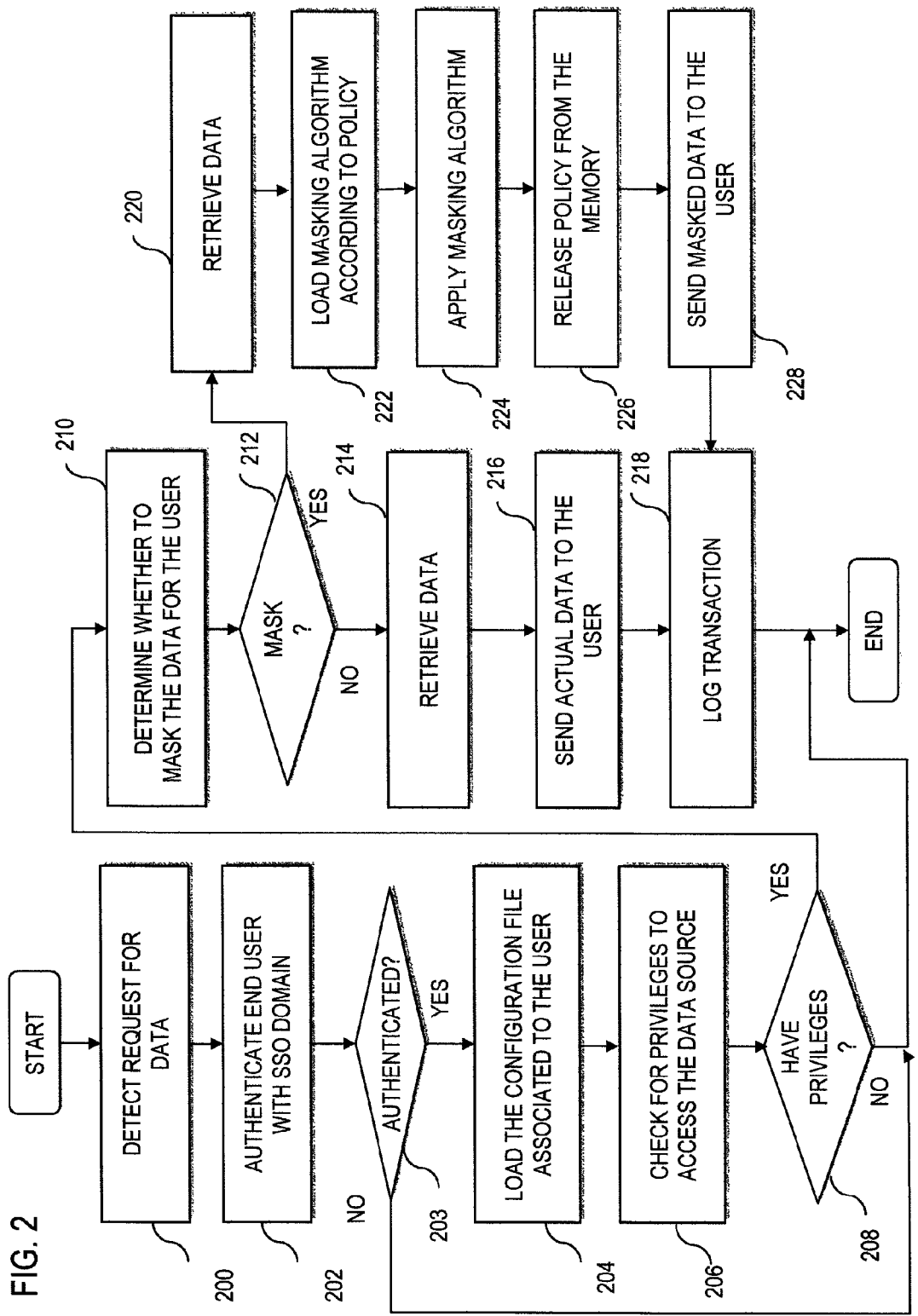
FIG. 2 is a flowchart of an overall data masking process, according to an exemplary embodiment.

FIG. 2 is a flowchart of a data masking process, according to various exemplary embodiments. By way of example, the data masking portal 172 performs the data masking process, which is described as follows. In step 200, the portal 172 detects a request for data, and authenticates the end user (step 202). If the determination is in the non-affirmative, per step 203, flow will end here; otherwise, the user configuration policy stored in the policy store 140 is retrieved, as in step 204. Based on the user configuration policy and the authentication process, the portal 172 determines, per steps 206 and 208, whether the user has access to this data source. If the user has the proper privilege, the portal 172 can obtain a masking policy and check whether the user has privilege to view the real data or masked data, per steps 210 and 212. If the user is not permitted access, the portal 172 can retrieve data corresponding to the request, and subsequently sending the actual data to the user, as in steps 214 and 216. Next, the transaction is logged by the report server 170, per step 218.

Returning to step 212 for the determination of whether the masked data is to be viewed, if so, the portal 172 can retrieve the data per step 220. In step 222, a masking algorithm is loaded according to the masking policy. The portal 172 then applies the masking algorithm to the retrieved data (step 224). In step 226, the policy is released from memory. This transaction is then logged by the report server 170, per step 218. The masked data is then forwarded to the user, as in step 228.

Data masking client components, such as static masking client, SQL client, LDAP client, Editor, TN3270, web browser, or applications, connect to the data masking proxy 120 for accessing any of the applications or databases of the data source 100. The data masking proxy 120, according to one embodiment, can act as a Windows service, a web service, or hypertext markup language (HTML) proxy.

Figure 3A:
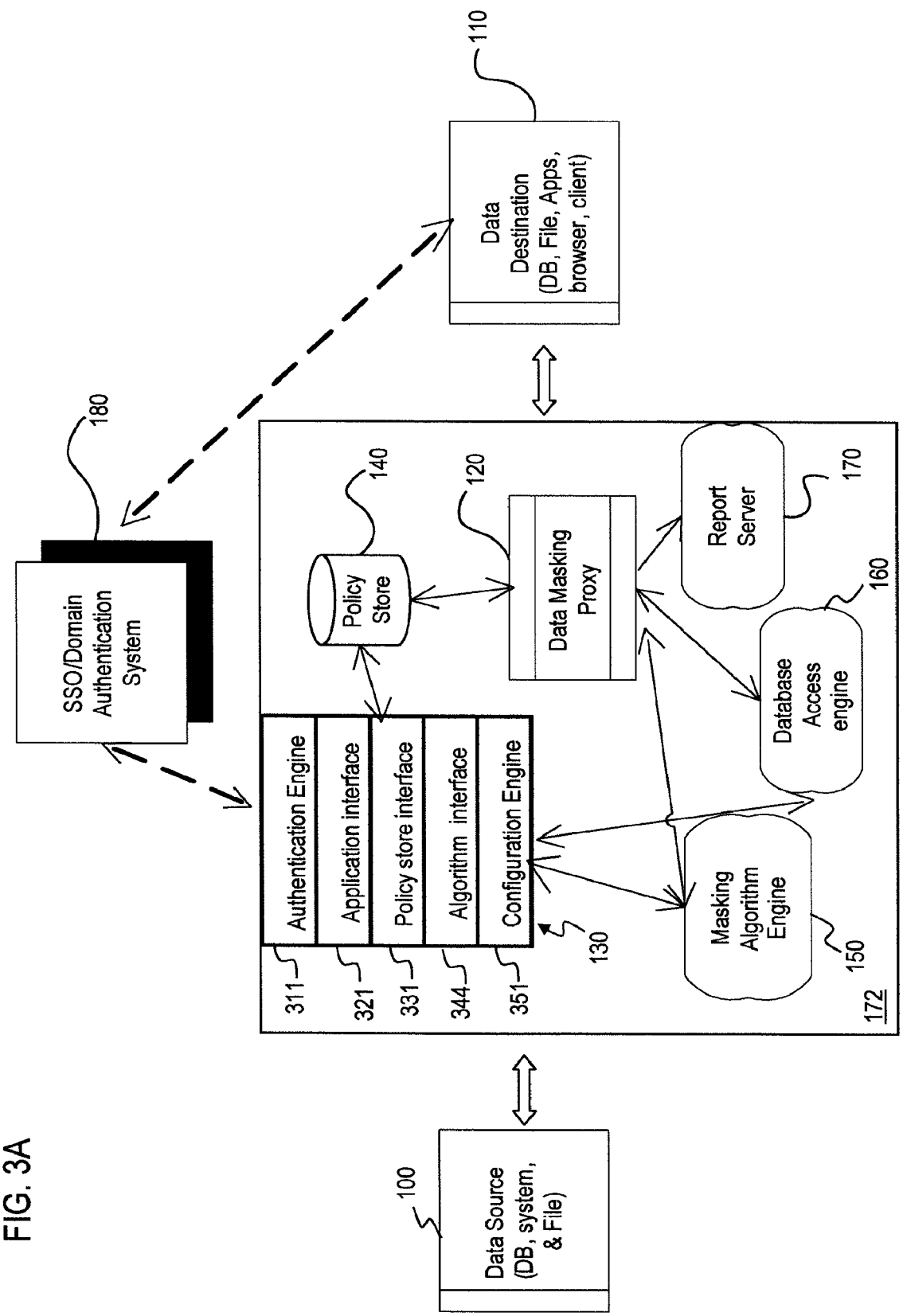

FIGS. 3A and 3B are, respectively, a diagram of a masking configuration wizard application of the system of FIG. 1, and a flowchart of policy configuration process, according to various exemplary embodiments. As shown in FIG. 3A, the masking configuration wizard (i.e., configuration engine) 130 permits configuration of each application or database or LDAP. The wizard application 130 steps the user through a series of input and selection options to specify the configuration. According to an exemplary embodiment, the masking configuration wizard 130 can include an authentication engine 210, an application interface 220, a policy store interface 230, an algorithm interface 240, and a configuration engine 250.

This configuration engine 130 is authenticated against the SSO/Domain infrastructure 180 so that an authorized user can utilize this wizard 130. Once authenticated, the user can be provided with a choice to configure a new application or reconfigure existing application, which was obtained from the policy store 140. During the configuration process, the user can browse available databases through the database access engine 160 for both data source 100 and data destination 110. Once the database details are obtained from the source database, the user has option to retrieve an individual table or an individual field to perform such legal requirements. Upon selecting the individual table from the database or the parameter from the application, the system can load the algorithms using the algorithm engine 150 for configuration of the masking policy for each application or database. Once all required parameters or fields required for an application or database are configured with the respective algorithm and a salt value (i.e., random data) required for the application or field, the configuration engine 351 can create an extended mark-up language (XML) policy according to each application and stored on the policy store 140.

In addition, the user details of those who need the data not to be masked will be added in the XML policy. In this manner, based on the user authentication and the "No Mask User list", the portal 172 can determine whether the data is to be masked, depending on the policy.

The above operation of the configuration engine is illustrated in FIG. 3B. In step 300, the user is authenticated based on the user inputs. If the user is authenticated, per the determination in step 302, the user can invoke an action, as in step 304; however, if the user is not authenticated, the process ends.

The process then determines whether the user action corresponds to a New Policy or an Existing Policy (step 306). If the user action is a "New Policy," the user can input an identifier or name of the policy or configuration, as in step 308. Additionally, the user can input the details such as Data Source type, Data source location, access credentials to access that data source, salt value per steps 310, 312, and 314. Further, the user can input Destination data source type and location as well as access credentials, per steps 316 and 318. In step 320, the user selects the required tables to mask. The required columns and mask algorithm are configured, per step 322.

In step 324, the user can specify "Users," who can access this data source and provide privileges to view real data or masked data, per step 326. This configuration is then saved to the policy store 140, as in step 328.

Returning to the action determination step 306, if the user action is associated with an "Existing Policy"—i.e., determined as "Re-Configure Policy", then the policy is retrieved, per step 330. The user can modify the source credentials, destination credentials, salt value, per steps 332, 334, and 336. At this point, the steps 320-328 are performed for this Existing Policy, as with the "New Policy" creation.

Figure 4A:
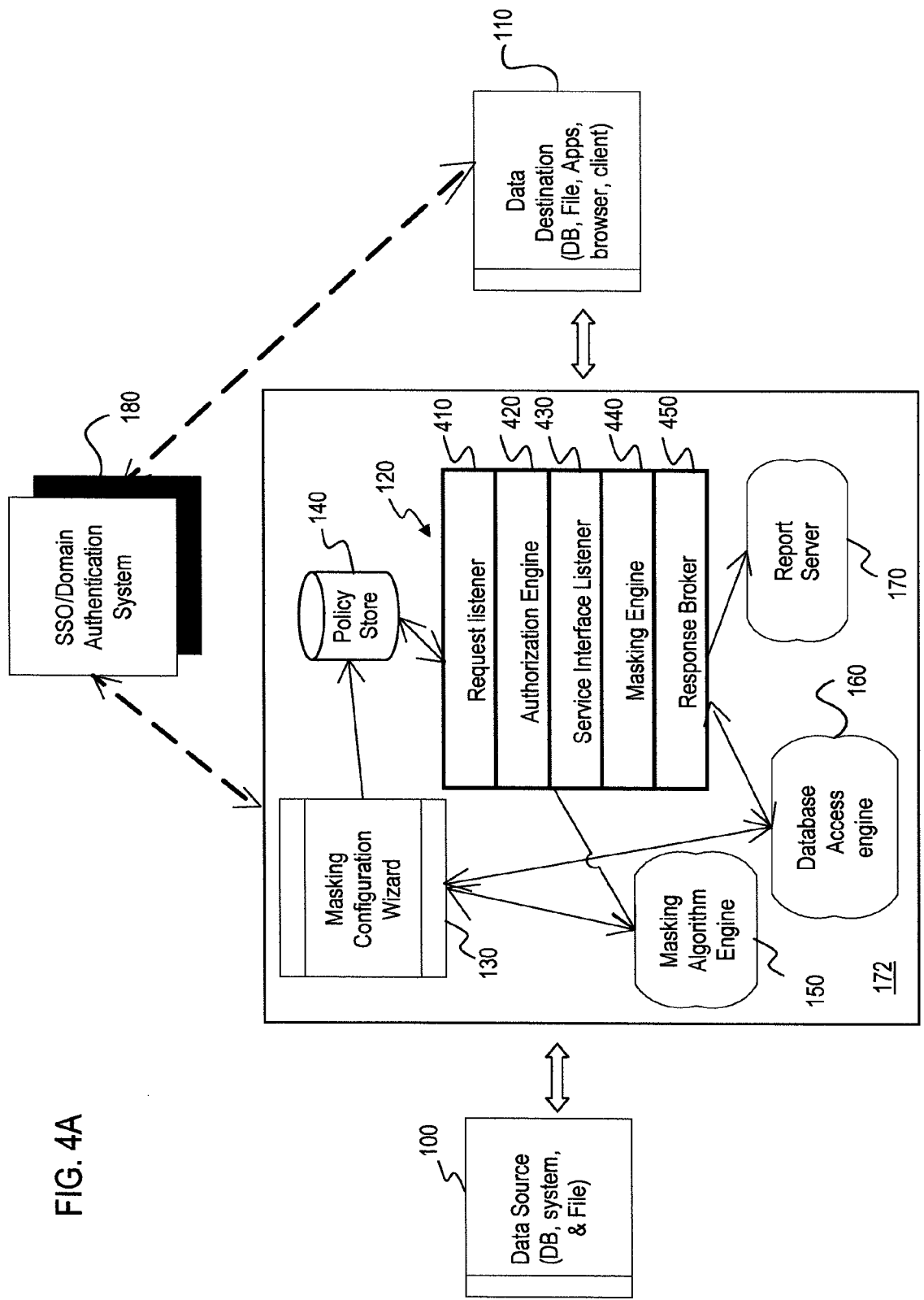
FIGS. 4A and 4B are, respectively, a diagram of a data masking proxy of the system of FIG. 1, and a flowchart of a data masking engine process, according to an exemplary embodiment.
Figure 4B:
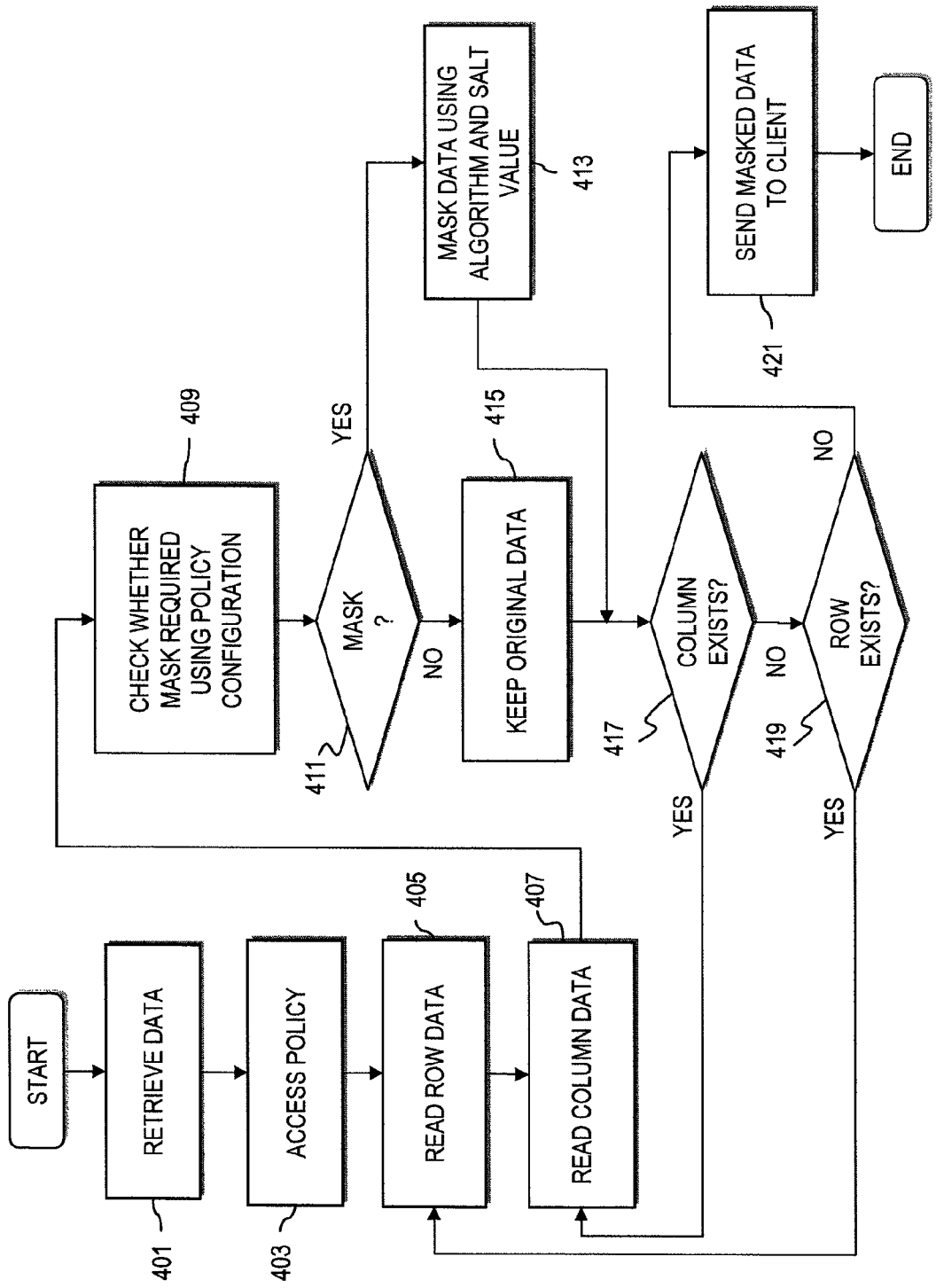

FIGS. 4A and 4B are, respectively, a diagram of a data masking proxy of the system of FIG. 1, and a flowchart of a data masking process, according to an exemplary embodiment. Data masking client components, such as static masking client, SQL client, LDAP client, Editor, TN3270, web browser, or applications, connect to the data masking proxy 120 for accessing any of the applications or databases of the data source 100. The data masking proxy 120, according to one embodiment, can act as a Windows service, a web service, Telnet Proxy, or hypertext markup language (HTML) proxy.

Figure 6:
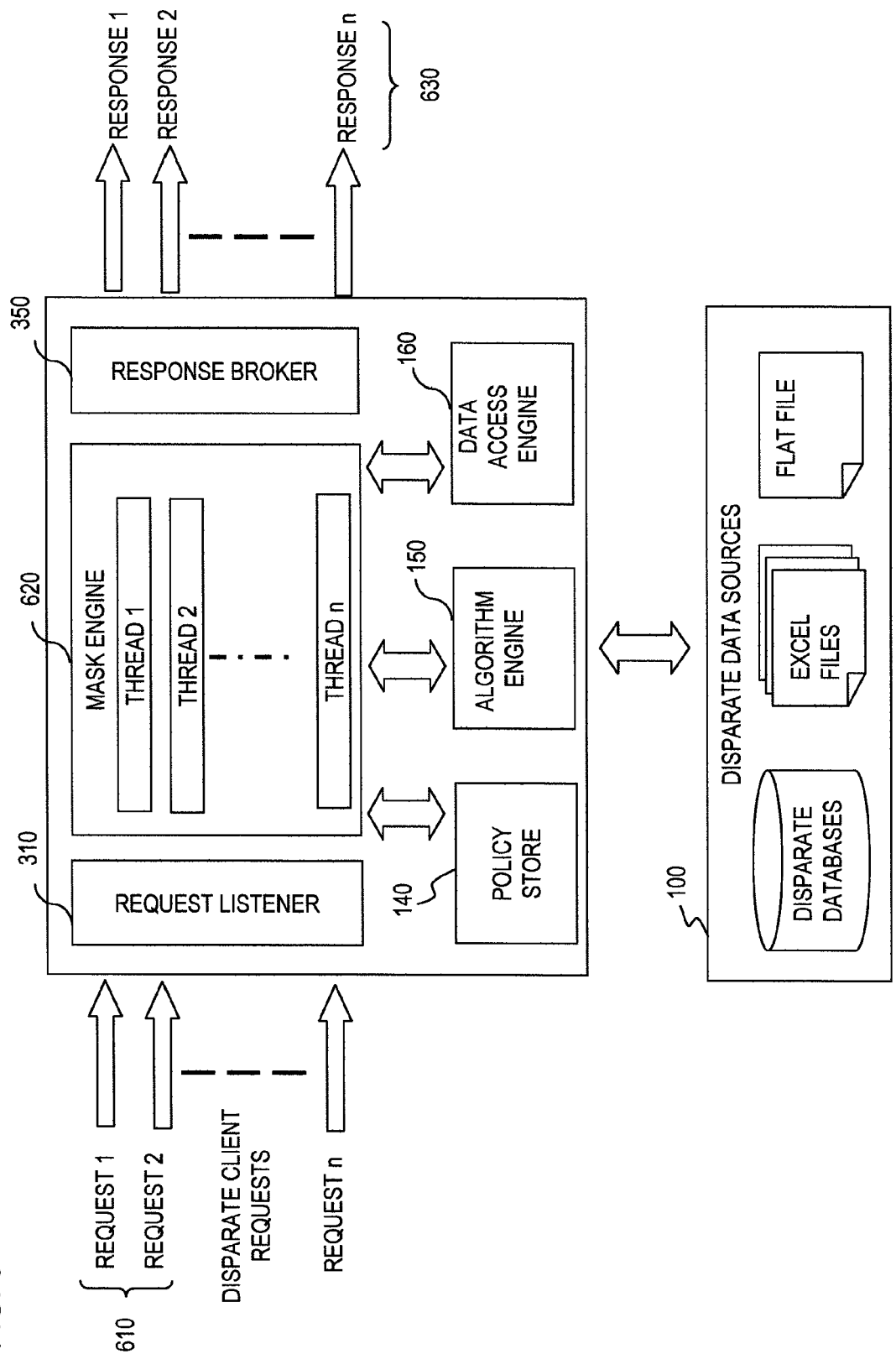
FIG. 6 is a circuit diagram showing overall data masking process as threaded model, according to an exemplary embodiment.

The data masking proxy 120, in an exemplary embodiment, includes a request listener 410, an authorization engine 420, a service interface listener 430, a masking engine 440, and a response broker 450. The request listener 410 listens to requests and classifies the requests to invoke the respective services for such requests, as illustrated in FIG. 6. Based on the request and the user authentication, the authorization engine 420 authorizes whether the data is to be masked based on the user information, as specified in the XML policy.

FIG. 4B describes the workflow of the data masking engine 172. In step 401, the portal 172 retrieves data from the corresponding data source with the help of data access components. In step 403, the policy details are accessed from the policy store 140. In an exemplary embodiment, data is read row by row, and column by column, per steps 405 and 407; this reading process continues for all relevant data, which in this example is a particular column. At this juncture, the process determines whether the data is to be masked according to the configuration policy (steps 409, 411). If masking is specified, the required mask algorithm is retrieved and applied to the column of data (step 413); otherwise, the original data is maintained (step 415). In steps 417 and 419, the process continues to determine whether masking is to be performed on the data, by column then row. In step 421, the masked data is provided to the client (or user).

Figure 5:
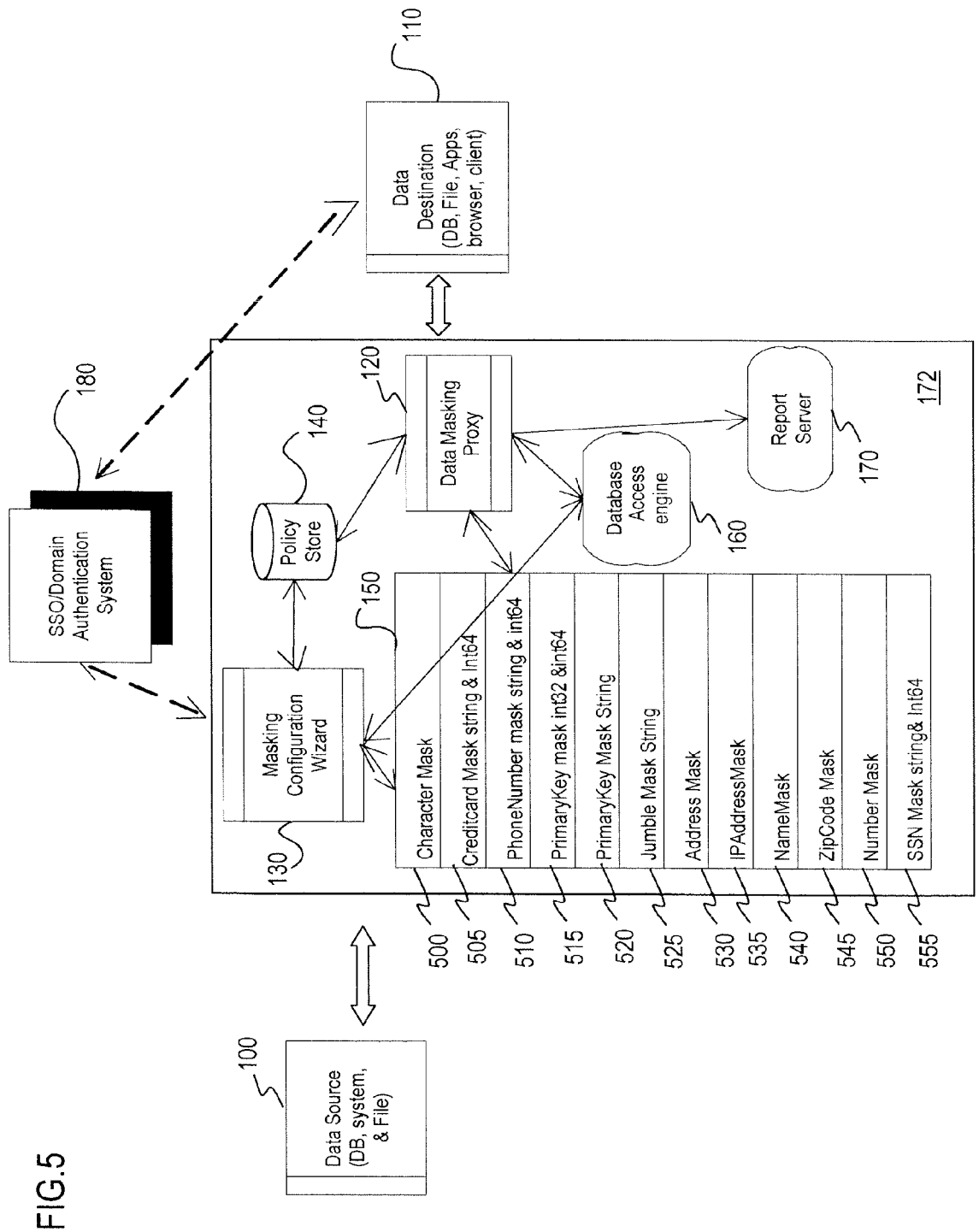
FIG. 5 is a diagram of a masking algorithm engine of the system of FIG. 1, according to an exemplary embodiment.

FIG. 5 is a diagram of a masking algorithm engine of the system of FIG. 1, according to an exemplary embodiment. For the purposes of illustration, the masking algorithm engine 150 support a variety of masking schemes 500-555 depending on the privacy data requirements. The algorithms 500-555 can accept custom defined salt value as input to the respective algorithm, so that the resultant masked value of the same data from two different applications can differ. This capability enhances the effectiveness of the masking algorithm as well as the applications. The algorithms can include a Character Mask scheme 500, a CreditCard Mask String and Int64 scheme 505, a PhoneNumber mask string and Int64 scheme 510, a PrimaryKey Mask Int32 and Int64 scheme 515, a PrimaryKey Mask String scheme 520, a Jumble Mask String scheme 525, an AddressMask scheme 530, an IPAddressMask scheme 535, a NameMask scheme 540, a ZipCodeMask scheme 545, a NumberMask scheme 550, and a SSN mask string and Int64 scheme 555. It is contemplated that the algorithm engine 150 can be updated with other schemes based on the requirements.

The masking proxy, according to one embodiment, is further detailed in FIG. 6. Requests 610 from disparate clients are received by the Request Listener 310. The required number of threads are created by a Mask Engine 620, corresponding with the number of requests 610. For example, if n number of requests are received, the Mask Engine 620 utilizes n number of threads. The Mask Engine 620 communicates with the Policy store 140 to obtain the policy bounded for this request. The Mask Engine 620 uses the Algorithm Engine 150 to load the necessary algorithm to process the masking. The Data Access Engine 160 is used by the Mask Engine 620 to access data from the Data sources 100. The processed data is supplied to the Response broker 350, which then handovers the data as one or more responses 630 to the clients. In this example, n responses are generated for the n requests.

It is recognized that the data masking requirement for any large organization can be rather extensive. These applications can be Static masking, SQL Client, LDAP client, HTM Masking, mainframe access client, editor for various documents type and etc. which are presented in other patents (refer the previous patents) by the same inventors.

The above described processes relating to data masking may be implemented via software, hardware (e.g., general processor, DSP chip, an application specific integrated circuit (ASIC), field programmable gate arrays (FPGAs), etc.), firmware, or a combination thereof. Such exemplary hardware for performing the described functions is detailed below.

Figure 7:
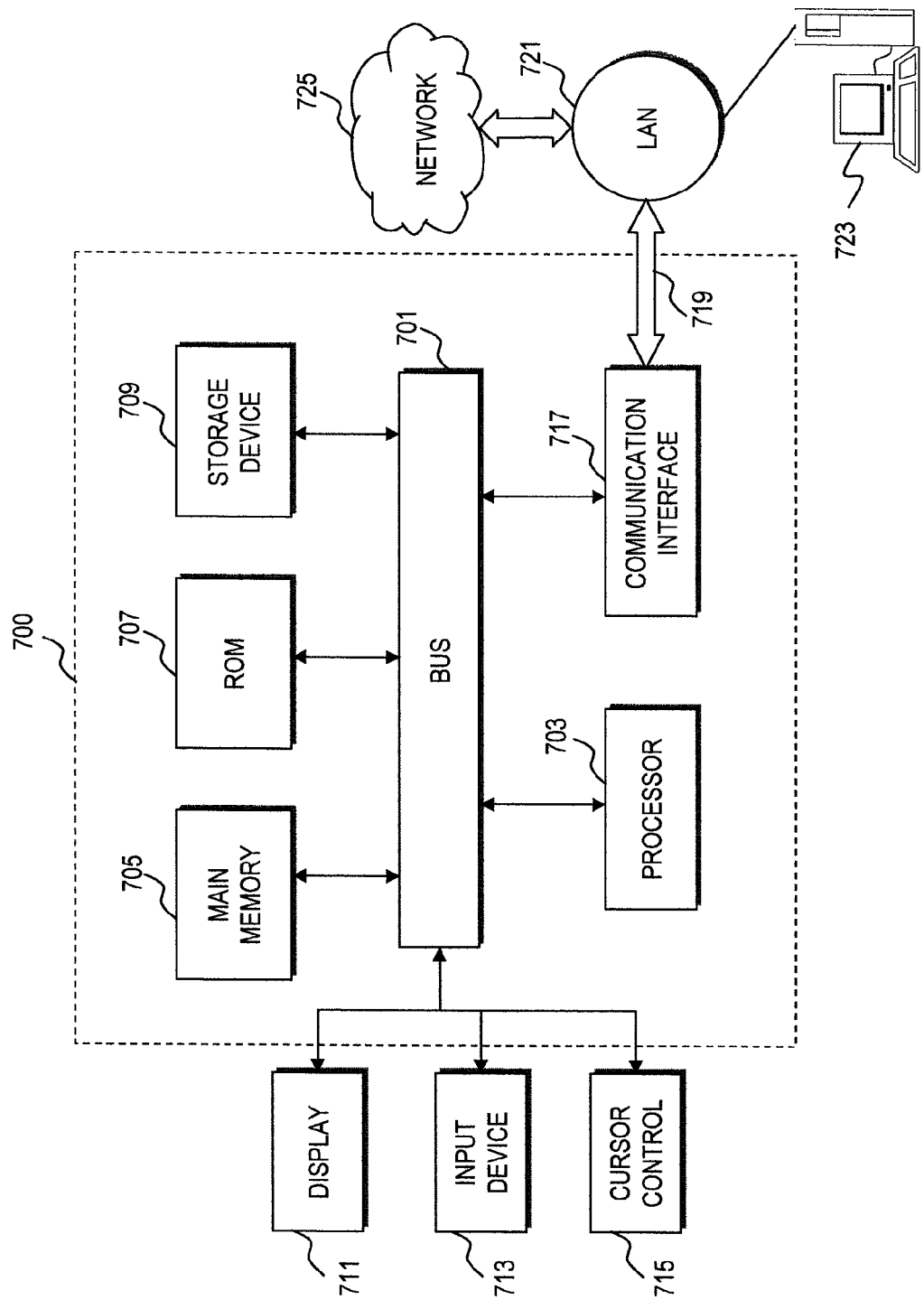
FIG. 7 is a diagram of a computer system that can be used to implement various exemplary embodiments.

FIG. 7 illustrates a computer system 700 upon which an embodiment according to an exemplary embodiment can be implemented. For example, the processes described herein can be implemented using the computer system 700. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to one embodiment contemplated herein, the processes described are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement certain embodiments. Thus, the exemplary embodiments are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an exemplary embodiment through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out various embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

The following patent applications are incorporated herein by reference in their entireties: co-pending U.S. patent application Ser. No. 11/839,816 filed Aug. 16, 2007 entitled "Method and Apparatus for Providing a Data Masking Portal"; and co-pending U.S. patent application Ser. No. 11/839,802 filed Aug. 16, 2007,entitled "Method and Apparatus for Rule-Based Masking of Data."

What is claimed is:

1. A method comprising:
    invoking an action of a user, in response to a determination that the user is authenticated;
    determining, by a processor, whether the action initiated by the authenticated user corresponds to one of a plurality of policies stored in a policy store, wherein a request for data to be retrieved from a data source is initiated by the user and the policies relate to whether the data is to be masked;
    generating a new policy or modifying the corresponding policy based on the determination of whether the action corresponds to one of the plurality of policies;
    receiving information associated with the new policy or the modified corresponding policy, wherein the information is input by the user and includes a selection of necessary data to be masked; and
    storing the new policy or the modified corresponding policy in the policy store.

2. A method as recited in claim 1, wherein the input information includes an identifier for the new policy, data source type, data source location, access credentials for the data source, salt value for a masking algorithm used to mask the data, data destination type, data destination location, or access credentials for a data destination.

3. A method as recited in claim 1, wherein the input information includes user privilege information for viewing the data.

4. A method as recited in claim 1, wherein the data from the data source is in form of one or more database tables, the further comprising:

receiving selection information about the tables that is to be retrieved from a data source.

5. A method as recited in claim 1, wherein the user specifies information about users who are authorized to access the data.

6. A method as recited in claim 1, wherein the new policy is generated when a match is not found, and the corresponding policy is modified when a match is found.

7. A system comprising:
at least one processor;
a policy store configured to store a plurality of policies relating to whether data to be retrieved from a data source is to be masked; and
a data masking proxy configured to invoke an action of a user, in response to a determination that the user is authenticated, and further configured to access the policy store and to determine whether an action initiated by an authenticated user corresponds to one of the stored policies, a request for the data is initiated by the user,
wherein the data masking proxy is further configured to generate a new policy or modify the corresponding policy based on the determination of whether the action corresponds to one of the plurality of policies the user inputting information including a selection of necessary data to be masked and associated with the new policy or the modified corresponding policy, the new policy or the modified corresponding policy being stored in the policy store.

8. A system as recited in claim 7, wherein the input information includes an identifier for the new policy, data source type, data source location, access credentials for the data source, salt value for a masking algorithm used to mask the data, data destination type, data destination location, or access credentials for a data destination.

9. A system as recited in claim 7, wherein the input information includes user privilege information for viewing the data.

10. A system as recited in claim 7, wherein the data from the data source is in form of one or more database tables, the user specifying selection information about the tables that is to be retrieved from a data source.

11. A system as recited in claim 7, wherein the user specifies information about users who are authorized to access the data.

12. A system as recited in claim 7, wherein the new policy is generated when a match is not found, and the corresponding policy is modified when a match is found.

13. A method comprising:
receiving, by a processor, a request from an application for retrieval of data;
authenticating an end user associated with the request;
invoking an action of the user, in response to authenticating the user;
determining a service corresponding to the request;
masking the data based on the request and the authentication; and
forwarding the masked data to application,
wherein the determination whether to mask the data is further based on policy information stored in a policy store, wherein the policy information was created in response to input received from the user after authentication of the user and the input includes a selection of necessary data to be masked.

14. A method as recited in claim 13, wherein the data is retrieved from one of a plurality of data sources, and the requests are processed using data from different ones of the data sources.

15. A method as recited in claim 13, further comprising:
generating a thread to process the request;
receiving another request from another application; and
generating another thread to process the other request.

16. A method as recited in claim 15, further comprising:
outputting a plurality of responses corresponding to the requests, wherein the responses include respective masked data.

17. A method according to claim 15, wherein the applications include anyone or more of a Structure Query Language (SQL) application, a Lightweight Directory Access Protocol (LDAP), or a HyperText Markup Language (HTML) application.

18. A system comprising:
at least one processor;
a request listener configured to receive a request from an application for retrieval of data;
an authorization engine configured to authenticate an end user associated with the request;
a data masking proxy configured to invoke an action of a user, in response to authentication of the user;
a service interface listener configured to determine a service corresponding to the request;
a masking engine configured to mask the data, using a masking algorithm, based on the request and the authentication; and
a response broker configured to forward the masked data to application,
wherein the determination whether to mask the data is further based on policy information stored in a policy store, wherein the policy information was created in response to input received from the user after authentication of the user and the input includes a selection of necessary data to be masked.

19. A system as recited in claim 18, wherein the request listener receives a plurality of requests from a plurality of applications, the system further comprising:
a mask engine configured to generate a plurality of threads configured to process the requests.

20. A system as recited in claim 19, further comprising:
a data access engine configured to communicate with a plurality of data sources, wherein the data is retrieved from one of the data sources, and the requests are processed using data from different ones of the data sources.

21. A system as recited in claim 19, wherein the response broker is further configured to output a plurality of responses corresponding to the requests, wherein the responses include respective masked data.

22. A system according to claim 19, wherein the applications include anyone or more of a Structure Query Language (SQL) application, a Lightweight Directory Access Protocol (LDAP), or a HyperText Markup Language (HTML) application.

* * * * *